(12) United States Patent
Schulakow-Klass et al.

(10) Patent No.: US 9,027,743 B2
(45) Date of Patent: May 12, 2015

(54) PALLET CAR CHANGING DEVICE

(75) Inventors: Andrej Schulakow-Klass, Wiesbaden (DE); Juergen Emmel, Biebesheim (DE); Thomas Holzhauer, Frankfurt am Main (DE)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 14/110,191

(22) PCT Filed: Mar. 29, 2012

(86) PCT No.: PCT/EP2012/055624
§ 371 (c)(1),
(2), (4) Date: Oct. 7, 2013

(87) PCT Pub. No.: WO2012/136558
PCT Pub. Date: Oct. 11, 2012

(65) Prior Publication Data
US 2014/0021016 A1    Jan. 23, 2014

(30) Foreign Application Priority Data
Apr. 8, 2011   (DE) .......................... 10 2011 016 467

(51) Int. Cl.
*B65G 35/08*     (2006.01)
*F27B 21/06*     (2006.01)
*F27D 3/12*      (2006.01)

(52) U.S. Cl.
CPC ............... *B65G 35/08* (2013.01); *F27B 21/06* (2013.01); *F27D 3/123* (2013.01)

(58) Field of Classification Search
CPC ...... B65G 35/08; B65G 17/002; B65G 17/38; F27D 3/123
USPC ............... 198/795, 861.1, 465.1; 104/130.01, 104/130.03, 130.05, 130.09
See application file for complete search history.

(56) References Cited

U.S. PATENT DOCUMENTS

| | | | | |
|---|---|---|---|---|
| 3,863,755 | A * | 2/1975 | Hartwig | ........................ 198/637 |
| 3,918,894 | A * | 11/1975 | Stanke et al. | ................. 198/795 |
| 4,261,459 | A * | 4/1981 | Latowski et al. | ............. 198/795 |
| 4,946,025 | A * | 8/1990 | Murphy | ..................... 198/465.1 |
| 5,755,316 | A | 5/1998 | Reist | |
| 6,523,673 | B1 | 2/2003 | Fenton | |
| 7,431,150 | B2 * | 10/2008 | Ranger | ........................ 198/795 |

FOREIGN PATENT DOCUMENTS

| | | |
|---|---|---|
| DE | 1167802 A | 4/1964 |
| DE | 3023061 A1 | 1/1982 |
| SU | 358363 | 11/1970 |

* cited by examiner

*Primary Examiner* — James R Bidwell
(74) *Attorney, Agent, or Firm* — Leydig, Voit & Mayer, Ltd.

(57) ABSTRACT

A device for changing a pallet car in a plant for the treatment of bulk materials where pallet cars that are continuously conveyed using a lifting wheel and a lowering wheel on an outer rail and an inner rail in an endless chain includes, in regions of a bottom and top strand of the lifting wheel, first and second outer curve links of the outer rail that are openable such that the pallet car is removable from the chain and another pallet car is insertable into the chain. A removal switch is disposed in the region of the bottom strand of the lifting wheel, via which the pallet car is movable out from the chain, and a supply switch is disposed in the region of the top strand of the lifting wheel, via which the pallet car is insertable into the chain.

12 Claims, 8 Drawing Sheets

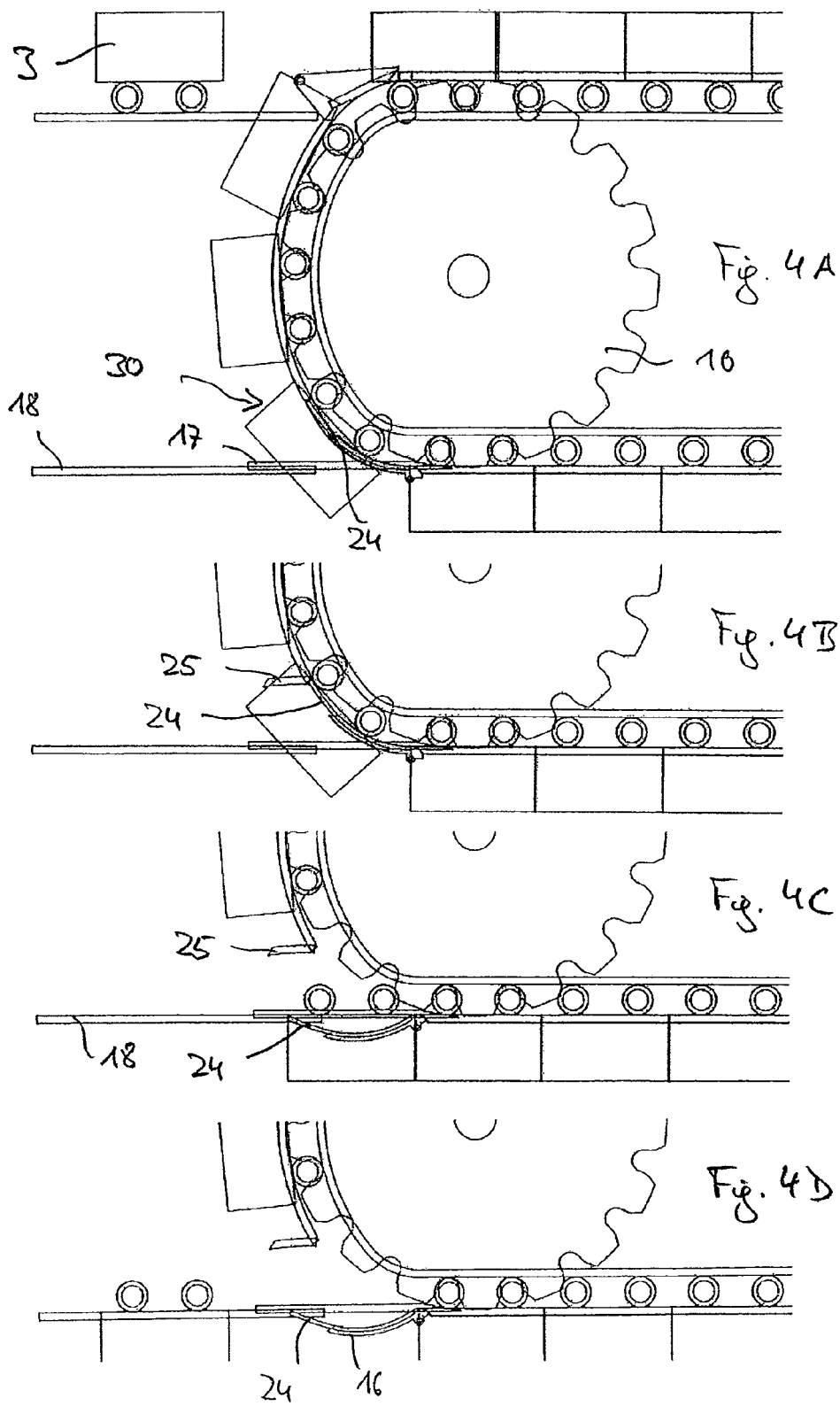

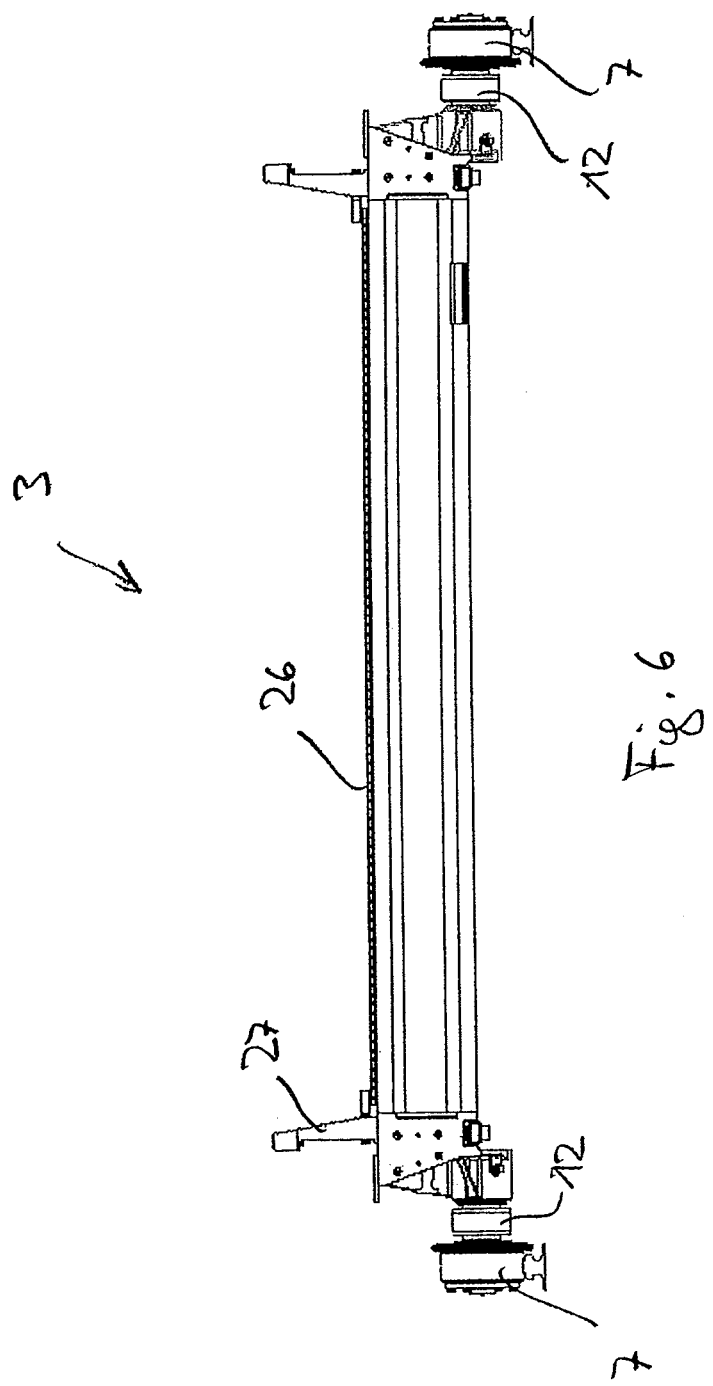

PALLET CAR CHANGING DEVICE

CROSS-REFERENCE TO PRIOR APPLICATIONS

This application is a U.S. National Phase Application under 35 U.S.C. §371 of International Application No. PCT/EP2012/055624, filed on Mar. 29, 2012, and claims benefit to German Patent Application No. DE 10 2011 016 467.7, filed on Apr. 8, 2011. The International Application was published in English on Oct. 11, 2012, as WO 2012/136558 under PCT Article 21(2).

FIELD

The invention relates to a device for changing a pallet car in a plant for the treatment of bulk materials, such as iron or zinc ore pellets or sinter material, in which the pallet cars are continuously conveyed by means of a lifting wheel and a lowering wheel on rails in an endless chain, wherein in the region of the bottom strand of the lifting wheel an outer link of the curve rail (outer curve link) can be opened and the pallet car or the like can be removed from the chain by means of a transfer means, and wherein in the region of the top strand of the lifting wheel an outer curve link of the rail can be opened and the pallet car or the like can be inserted into the chain by means of a transfer means. The invention also relates to a method for changing a pallet car in such a plant.

BACKGROUND

In pelletizing or sintering plants the bulk material to be treated, for example iron ore or zinc ore, is charged onto pallet car which form an endless chain of pallet cars also referred to as traveling grate (cf. FIG. 1). The pallet cars are filled with the bulk material and pass through various treatment stations, in which a thermal treatment of the material, such as drying, firing and cooling, is effected. By a lifting or drive wheel, the pallet car chain is moved through the treatment stations along a top strand, wherein the wheels of the pallet cars are guided in rails. At the end of the top strand, the heat-treated material is dumped by gravity at a lowering wheel or tipping wheel (discharge station), whereupon the empty pallet cars are returned upside down along a bottom strand to the lifting wheel. During conveyance in the top strand and the bottom strand, a contact pressure between the individual pallet cars brings about the necessary chain connection. Gear wheels of the lifting and lowering wheels engage pressure rollers which are arranged on the axle of the pallet cars beside the track rollers, in order to lift the pallet cars and convey the same in vertical direction.

Since the pallet cars with their components are subject to a high thermal and mechanical wear during the production, they must be exchanged after a certain degree of wear or damage. Conventionally, such change requires stopping of the lifting wheel for 5 to 10 minutes, which can lead to an additional thermal damage of the pallet cars in the top strand. Moreover, production must also be stopped in this shut-down period. After the pallet car change, the pelletizing and sintering process must then again adjust to a stable production level. This adjustment phase, which in most cases only is terminated after a few turnaround cycles, likewise has an adverse effect on the product quality.

To avoid the above-described disadvantages of the discontinuous changing devices, it has also been proposed already to perform a continuous pallet car exchange. The pallet car to be changed here is removed from the pallet car chain and a new pallet car is inserted in the free chain position. The change is effected with running traveling grate, so that two different plant positions are required for the partial functions of bringing out and bringing in. The changing device consists of two separate units which operate one after the other.

An example of a continuous changing device is described in U.S. Pat. No. 6,523,673. The changing device is arranged in the lifting wheel bottom strand and in the lifting wheel top strand. Removal of the pallet car is effected in the bottom strand. For this purpose, the guide rail is opened downwards and the pallet car is brought out on a movable conveying means. The conveying means is a sliding table which has the same translatory direction of action as the traveling grate conveyance in the bottom strand. In the top strand, a new pallet car is lifted into the traveling grate by means of a rotatable gripping mechanism, wherein the necessary insertion opening in the curve rails is generated by means of a rotatable flap which is opened upwards. Here as well, however, additional lifting and conveying means are required for removing and inserting the pallet cars.

SUMMARY

In an embodiment, the present invention provides a device for changing a pallet car in a plant for the treatment of bulk materials. The plant has pallet cars that are continuously conveyed by means of a lifting wheel and a lowering wheel on an outer rail and an inner rail in an endless chain. In a region of a bottom strand of the lifting wheel, a first outer curve link of the outer rail is openable such that the pallet car is removable from the chain. In a region of a top strand of the lifting wheel, a second outer curve link of the outer rail is openable such that the pallet car is insertable into the chain. The device includes a removal switch disposed in the region of the bottom strand of the lifting wheel, via which the pallet car is movable out from the chain, and a supply switch disposed in the region of the top strand of the lifting wheel, via which the pallet car is insertable into the chain.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6 shows a schematic view of a pallet car with a representation of the track roller and the pressure roller, FIGS. 7A and B schematically show a partial representation of a pallet car changing device according to the invention including a supply and removal arrangement on a pelletizing machine in a front view and a side view, respectively, FIG. 8 schematically shows the device for removing the pallet car at the bottom strand of the lifting wheel in the region of the outer guide rail, and FIG. 9 schematically shows the device for supplying the lifting wheel in the top strand of the lifting wheel in the region of the inner guide rail.

DETAILED DESCRIPTION

Figure 1:
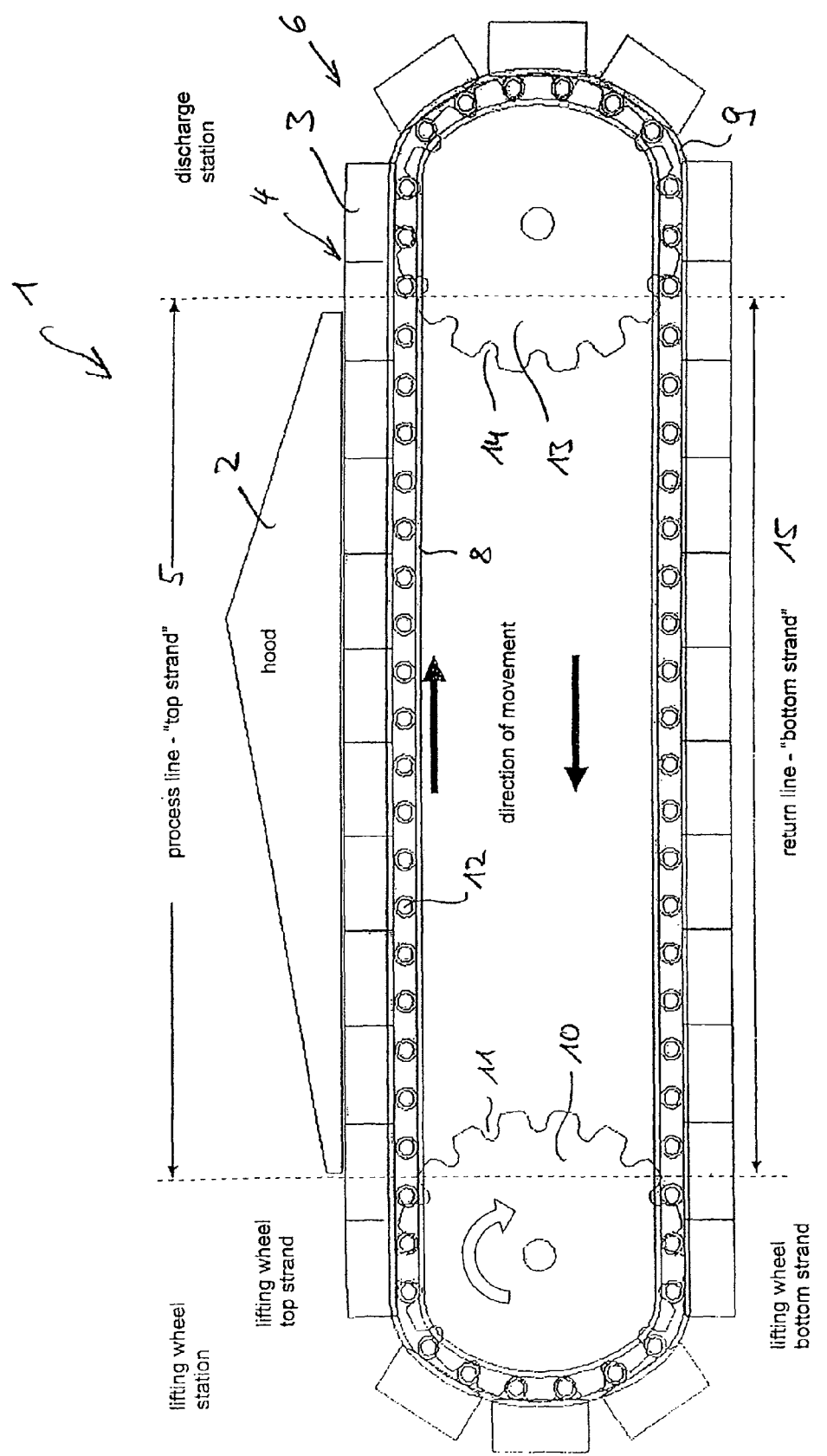
FIG. 1 schematically shows a pelletizing machine with traveling grate.

In an embodiment, the invention provides a simpler, more reliable, safer and less expensive possibility for exchanging the pallet cars while the plant is running.

In an embodiment, the region of the bottom strand of the lifting wheel a removal switch is provided, by means of which a pallet car or the like can be moved out from the chain, and that in the region of the top strand of the lifting wheel a supply switch is provided, by means of which a pallet car or the like can be moved into the chain. Hence, the change can be carried out without a plant shutdown, but at the minimum production speed.

With the switch solution according to the invention, the pallet car movement on its own wheels is exploited, so that no additional gripping and conveying mechanisms must be used, on which a complete pallet car would have to be positioned. Correspondingly, the times for the gripping and positioning functions of the conventional solutions also are eliminated. By lifting the pallet car at the lifting wheel from the bottom strand onto the top strand, the traveling grate chain is interrupted, so that during lifting no pressure contact exists between the pallet cars. Thus, an additional means for releasing the traveling grate chain is not necessary.

In accordance with a preferred aspect of the invention, the removal switch, preferably on the inside of the outer rail, includes a fixed switch which engages the pressure rollers of the pallet cars. Due to the fixed switch, more time is gained for bringing out and opening the curved rail, since the succeeding pallet cars still can perform a translational movement on the fixed switch, before they are again inserted into the corresponding tooth gap in the rotating lifting wheel by closing the outer curve guide. It is important here that the rear pallet car axle is positively guided by a lifting wheel tooth.

For opening the outer guide rail according to the invention, a pivotable curve link is provided on the removal switch, which preferably is driven by an actuator transmission. As a result, the outer link of the curve rail can easily be opened, so that the pallet car can be moved out from the plant on the fixed switch.

Since the pallet cars do not have their own drives—in the pelletizing or sintering plant the driving force is provided via the lifting wheel—it is provided in accordance with a development of the invention to associate a pulling device to the removal switch for pulling out the pallet cars. Since the pallet cars roll on the fixed switch, it is not required to lift them, and a simple pulling device is sufficient for removal.

In accordance with the invention, a pivotable curve link also is provided at the supply switch, in order to open the outer curve guide at the top strand of the lifting wheel.

In accordance with a particularly preferred aspect of the invention, the pivotable curve link forms both the outer curve guide and the rail for inserting the pallet car. The position of the switch is realized by a downwardly directed movement, with which at the same time the curve guide is opened for inserting the pallet car. This reduces the time required for the changing operation, which is limited by the velocity of the moving traveling grate. The plane of action of the adjusting mechanism lies parallel to the translational pallet car movement. To ensure a collision-free course of movement of the adjusting mechanism, the inner curve guide is adapted to the transmission shape of the switch curve link in accordance with the invention.

In accordance with a development of this invention, a common actuator transmission is provided for positioning the supply switch and opening the outer curve guide, wherein the actuator transmission preferably is arranged above the curve rail. By combining the functions of opening the curve guide and positioning the switch in a transmission member, a minimum size of the actuators is realized. The actuator transmission can be realized with simple and positively guided types of transmission, wherein a simple rotary arm and a four-joint system sufficiently satisfy all tasks.

For inserting the pallet car into the tooth gap of the lifting wheel, a pushing device is assigned to the supply switch in accordance with the invention.

The above-described configuration of the pallet car changing device is conceived for a continuous change during ongoing operation of the plant. Due to the high thermal and mechanical loads in the plant it also occurs, however, that the pressure rollers which should be engaged by the fixed switch for removing the pallet car are damaged. In such a case, the pallet car no longer can be exchanged during ongoing operation of the plant, so that a manual changing operation must be provided.

Since the necessary curve openings for the continuous change are designed such that the pallet car can be moved out from the traveling grate on their rollers, the resulting curve opening is not sufficient for lifting out a complete pallet car. In accordance with the invention it therefore is provided that on the outer curve guide adjacent to the pivotable curve link a second pivotable arc is provided, which increases the removable opening by swinging open.

For lifting out the pallet car, the existing curve opening mechanism can be employed. However, the lever length must be increased, because the roller spacing is greater than the effective lever length of the curve opening. In accordance with a development of the invention, a second, parallel curve arm or arc therefore is provided, which can be added by means of a rotary movement or by a translational movement. In accordance with the invention, this second curve arc has a greater length than the movable outer link of the curve rail, so that it can accommodate the rollers of both axles of the lift truck. In continuous operation, this second curve arc can be folded away, so as not to impede the removal of a pallet car with the traveling grate moving on.

After moving the pallet car out from the traveling grate, the same is moved out on the track rollers like during the continuous change. There can be provided an additional conveyor, such as a crane, which serves to remove the exchanged pallet car from the rail guide and insert a new pallet car. The new pallet car is positioned via the extended rotary arc and is again inserted into the traveling grate. It is of course also possible to utilize the above-described supply switch at the top strand of the lifting wheel for inserting the new pallet car.

The invention also comprises a method for changing a pallet car or the like in a plant for the treatment of bulk materials, such as iron or zinc ore pellets or sinter material, in which the pallet car are continuously conveyed on rails in an endless chain via a lifting wheel and a lowering wheel, wherein in the region of a bottom strand of a lifting wheel an outer link of the curve rail is opened and the pallet car is moved out from the chain via a removal switch, wherein the outer curve link then is swiveled back, in order to close the rail, wherein in the region of a top strand of the lifting wheel an outer curve link of the rail is swiveled for opening a supply switch and the pallet car is moved into the chain via the supply switch, and wherein the outer curve link is again swiveled back, in order to close the rail.

By way of example, FIG. 1 shows a pelletizing plant 1 for producing ore pellets, in which the invention is employed. At a non-illustrated supply station under a hood 2, the bulk material is charged onto pallet cars 3 which form an endless pallet car chain referred to as "traveling grate" 4. Under the hood 2, the bulk material transported on the g pallet car 3 passes through a plurality of thermal treatment stations in which the bulk material for example is dried, preheated, fired and finally cooled again. At the treatment stations under the hood 2, the traveling grate 4 is guided on a top strand 5 of a continuous conveyor 6, wherein the track rollers 7 of the pallet car 3 are guided between an inner rail guide 8 and an outer rail guide 9. The drive of the traveling grate 4 is effected via a drive or lifting wheel 10, which is formed as gear wheel and with its tooth gaps (clearances) 11 engages pressure rollers 12 of the pallet cars 3 (cf. FIG. 6).

After passing through the hood 2, the lift trucks 3 of the traveling grate 4 reach a discharge station which is associated to a lowering or driven wheel 13 of the continuous conveyor 6. At the lowering wheel 13, like at the lifting wheel 10, tooth gaps 14 of the driven gear wheel engage the pressure rollers 12 of the pallet car 3. The pallet car 3 are tilted, so that their load is dumped by gravity. Since the pallet cars 3 are guided by the outer rail guide 9, they do not fall down themselves, but are returned upside down to the lifting wheel 10 in a bottom strand 15 of the continuous conveyor 6.

In normal operation, the traveling grate 4 circulates endlessly on the continuous conveyor 6 and transports the bulk material to be treated through the treatment stations under the hood 2, before it is dumped at the discharge station and further processed in a way not described here in detail.

Due to the high thermal and mechanical load, the pallet cars are damaged, so that the same repeatedly have to be moved out from the pelletizing machine 1 for maintenance and repair work. To avoid a shut-down of the plant, a continuous pallet car changing device is provided according to the invention, with which the pallet cars 3 to be serviced can be removed from the traveling grate 4 without stopping the pelletizing machine 1.

Figure 2A:
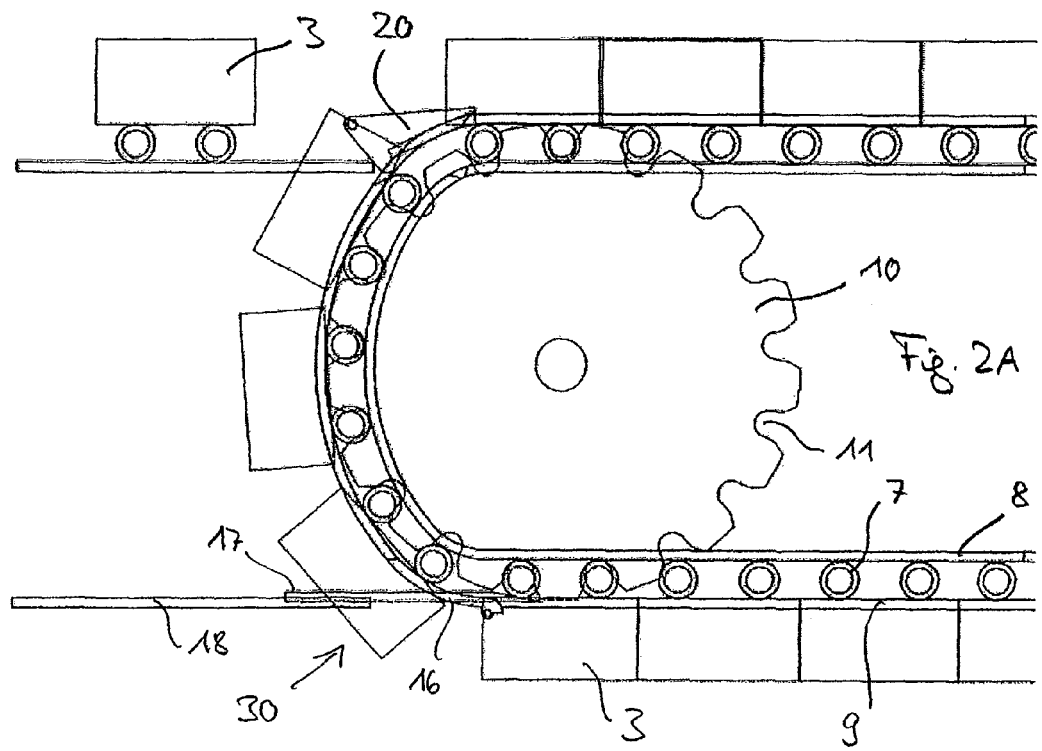
FIGS. 2A to C schematically show the removal of a pallet car at the bottom strand of the lifting wheel with the device according to the invention, FIGS. 3A to C schematically show the supply of a pallet car in the top strand of the lifting wheel with a device according to the invention, FIGS. 4A to D schematically show the removal of a pallet car, while the pelletizing machine is stopped, FIGS. 5A to C schematically show the supply of a pallet car to the bottom strand of the lifting wheel, while the pelletizing machine is stopped.
Figure 2B:
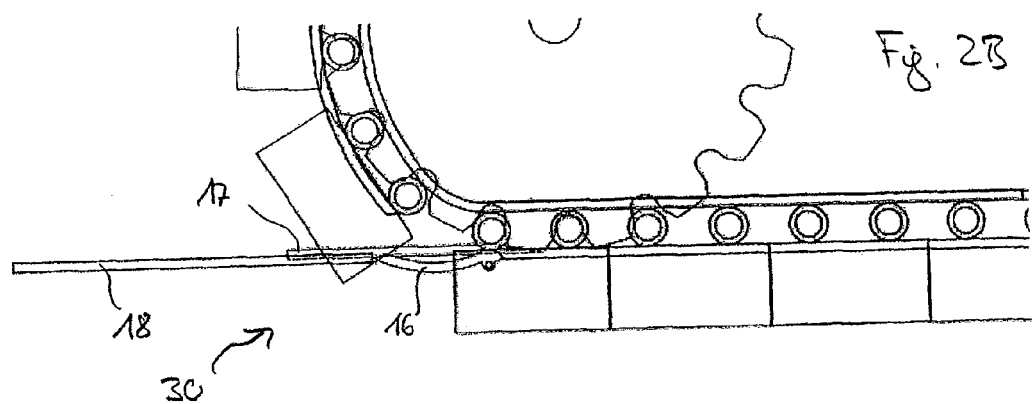
Figure 2C:
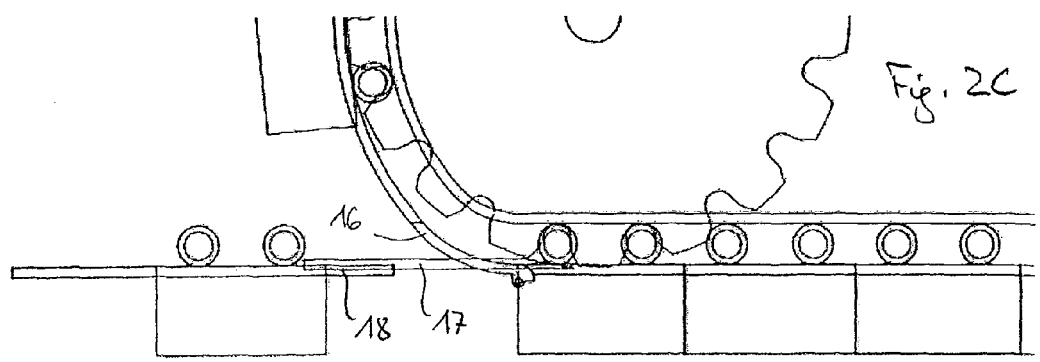

The procedure of removing a pallet car 3 from the traveling grate 4 is schematically illustrated in FIG. 2. FIGS. 2 to 5 each show only one rail of the rail pairs of the outer and inner curve guides 8 and 9.

Of course, a corresponding rail is associated to each side of the pallet car 3 (cf. FIG. 6). The following description analogously applies to the rail not shown here.

As is clearly shown in FIG. 2A, the direct contact between the pallet car 3 of the traveling grate 4 is separated due to the pallet car 3 being lifted by the lifting wheel 10. As a result, the pallet cars 3 are accessible individually. When a pallet car 3 now should be removed from the traveling grate 4, the outer curve guide 9 is opened in the region of the bottom strand 15 at the lifting wheel 10 by swiveling out an outer curve link 16. A fixed switch 17 extends parallel to the outer curve link 16, with a pressure roller 12 (cf. FIG. 6) of the pallet car 3 running up onto said switch. In continuation of the translational movement in the bottom strand 15, the pallet car 3 thereby can be removed from the traveling grate 4 in horizontal direction. Subsequent to the fixed switch 17, a guide rail 18 extending in extension of the outer rail guide is provided, onto which the track rollers 7 of the pallet car 3 are running up, so that the pallet car 3 can easily be moved out from the traveling grate 4 (cf. FIG. 2C). Due to the high weight of such pallet car 3, a pulling device 28 is provided for removing the pallet car 3 from the traveling grate 4 (cf. FIG. 7), which engages the pallet car 3 and pulls the same away via the fixed switch 17 and the guide rail 18.

By employing the fixed switch 17, time is gained for bringing out and opening the curve rail, since the succeeding pallet cars 3 temporarily can continue their translational movement on the fixed switch 17, until they are again inserted into the corresponding tooth gap 11 of the lifting wheel 20 by closing the outer curve link. To ensure an unambiguous positioning, the rear pallet car axle is positively guided by the lifting wheel tooth.

Figure 3A:
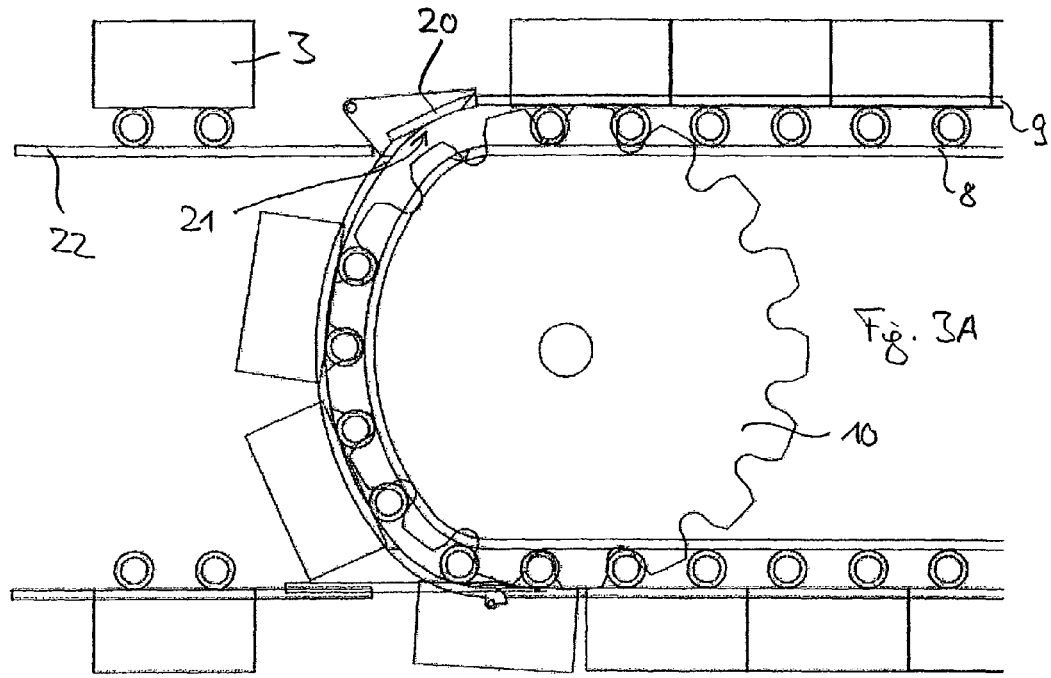
Figure 3B:
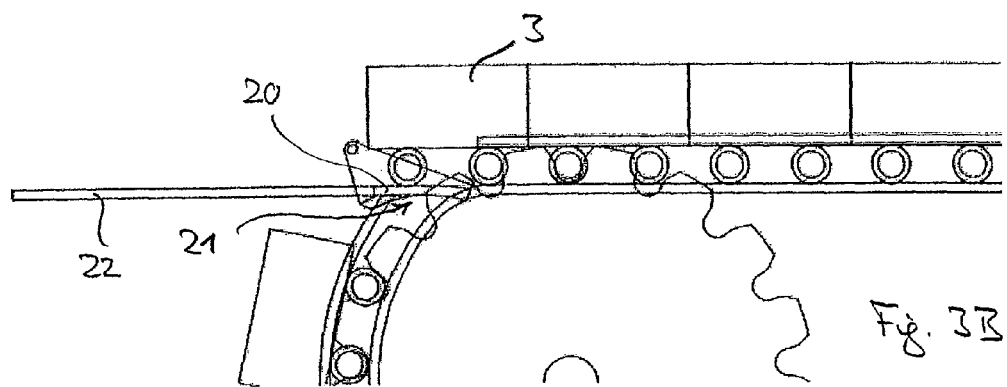
Figure 3C:
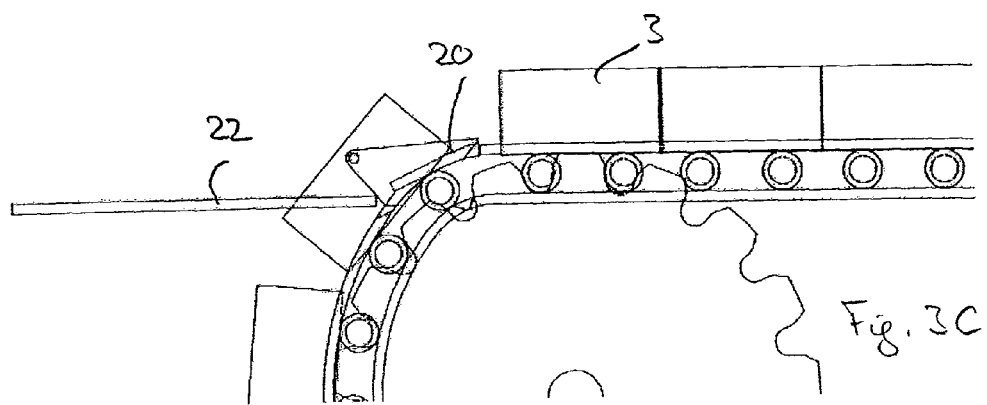

By removing the pallet car 3 at the bottom strand 15 of the lifting wheel 10 a gap is obtained between the pallet cars 3 (cf. FIG. 3A), which must be closed again to form a continuous traveling grate 4. In the region of the top strand 5 of the lifting wheel 10, a new pallet car 3 therefore is moved into the free lifting wheel position. This is schematically shown in FIG. 3. On the outer curve guide 9 a pivotable curve link 20 is provided, which in normal operation (cf. FIG. 3A) guides the pallet cars 3 of the traveling grate 4. For inserting the new pallet car 3, the curve link 20 is swivelled inwards via an actuating device described below, in order to position the switch 21 for supplying the pallet car 3 (cf. FIG. 3B). The pallet car 3 now can be inserted via the supply rail 22 and the curve link 20, so that its pressure rollers 12 engage in a tooth gap 11 of the lifting wheel 10 and the newly inserted pallet car 3 is moved on by the lifting wheel 10. Again, a continuous traveling grate 4 is obtained. As soon as the new pallet car 3 has passed the switch 21 with its rear axle, the curve link 20 can be swiveled back again, in order to close the outer guide rail 9 (cf. FIG. 3C). The operation of the traveling grate 4 thus can again be continued as usual.

The continuous pallet car change as described with reference to FIGS. 2 and 3 only is possible when the pressure rollers 12 of the pallet car 3, which are engaged by the fixed switch 17, still are in time. If the pressure rollers 12 are damaged, they cannot be moved out from the traveling grate 4 via the switch 17. In this case, a manual change is provided, as it will be explained with reference to FIGS. 4 and 5. In the following description of this embodiment, merely the differences to the continuous pallet car change will be discussed. In accordance with the invention, the additional means for the discontinuous pallet car changes are provided in addition to the elements which are used for the continuous pallet car change.

In FIGS. 4A to 4C, the removal of a damaged pallet car 3 from the traveling grate is shown. In FIG. 4A, the damaged pallet car 3 is arranged in the region of the pivotable curve link 16. Since it is not possible to move the pallet car 3 out on the fixed switch 17, the pallet car 3 must be held on its track rollers 7. For this purpose a second, pivotable curve arm 24 is provided, which is longer than the pivotable curve link 16 and in any case is provided parallel to the pivotable curve link 16 when performing the pallet car change. Since the space provided by the curve link 16 for swiveling out the pallet car 3 is not sufficient, a second arc 25 is provided in extension of the curve link 16, which can be swiveled in opposite direction and provides a larger opening. After opening the second arc 25 (FIG. 4B), the extended curve arc 24 is swiveled downwards, until the front track roller 7 of the pallet car 3 comes to rest on the guide rail 18 (cf. FIG. 4C). Now, like also in the continuous change principle, the pallet car 3 can be moved out on the guide rail 18 via its track rollers 7.

Figure 5A:
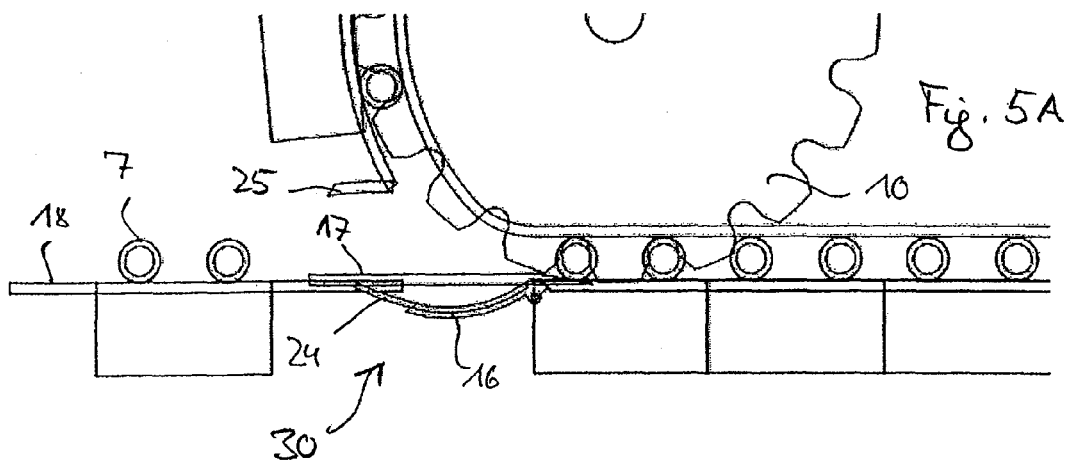
Figure 5B:
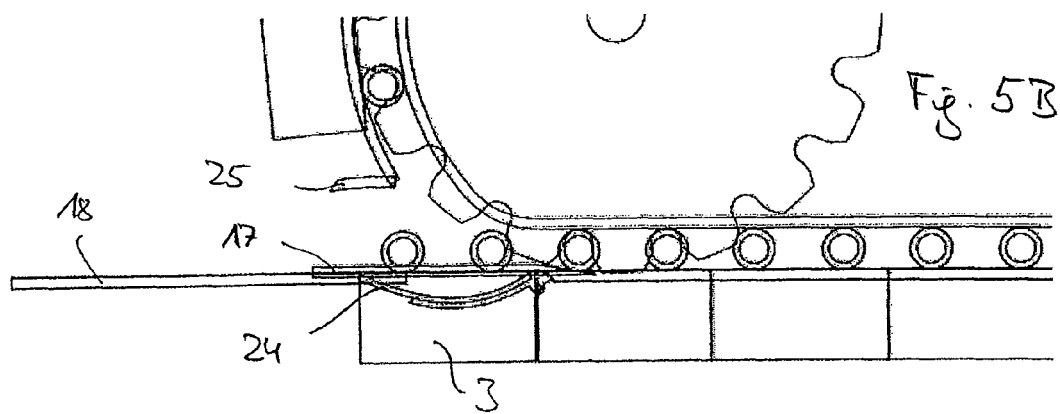
Figure 5C:
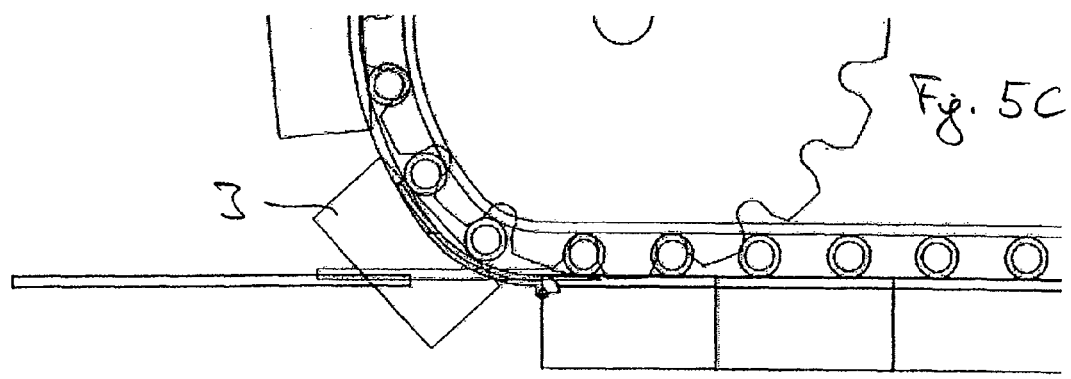

For inserting a new pallet car (cf. FIG. 5), the pallet car 3 is put onto the guide rail 18 via an additional conveyor, e.g. a crane (cf. FIG. 5A). Via the rail 18, the new pallet car now is moved into the free position on the traveling grate 4—wherein the pressure rollers 12 now also can engage the fixed switch 17—and by swiveling back the extended curve arc 24 and closing the opening by means of the second arc 25 it is then again inserted into the traveling grate 4 (cf. FIGS. 5B and 5C). Now, the drive can be switched on again and the traveling grate can be moved through the pelletizing plant 1 in the usual way.

It is of course also possible to also use the supply for the continuous change, as it is shown in FIG. 3, instead of supplying a new pallet car 3 as shown in FIG. 5. As a result, the shut-down periods of the plant can further be reduced, since the plant can already be started while supplying the new pallet car.

FIG. 6 schematically shows a pallet car 3 which will only briefly be described here. The bulk material is loaded onto a grate 26 and held by side walls 27 of the pallet car 3. In normal operation, the pallet car 3 runs on the rails of the continuous conveyor 6 with its track rollers 7. On lifting by the lifting wheel 10 or lowering by the lowering wheel 13, the tooth gaps 11 and 14 engage the pressure rollers 12 of the pallet cars 3 provided inwards of the track rollers 7. These pressure rollers 12 also are utilized for conveying the pallet car 3 on the fixed switch 17 for removal from the traveling grate 4.

Figure 7A:
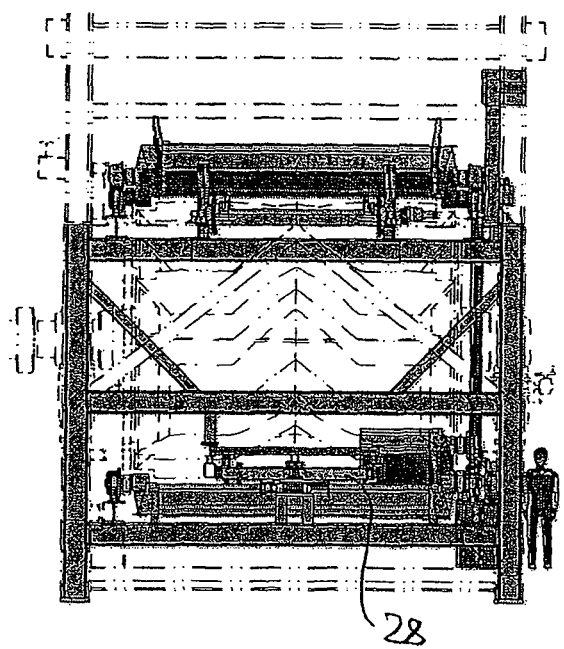
Figure 7B:
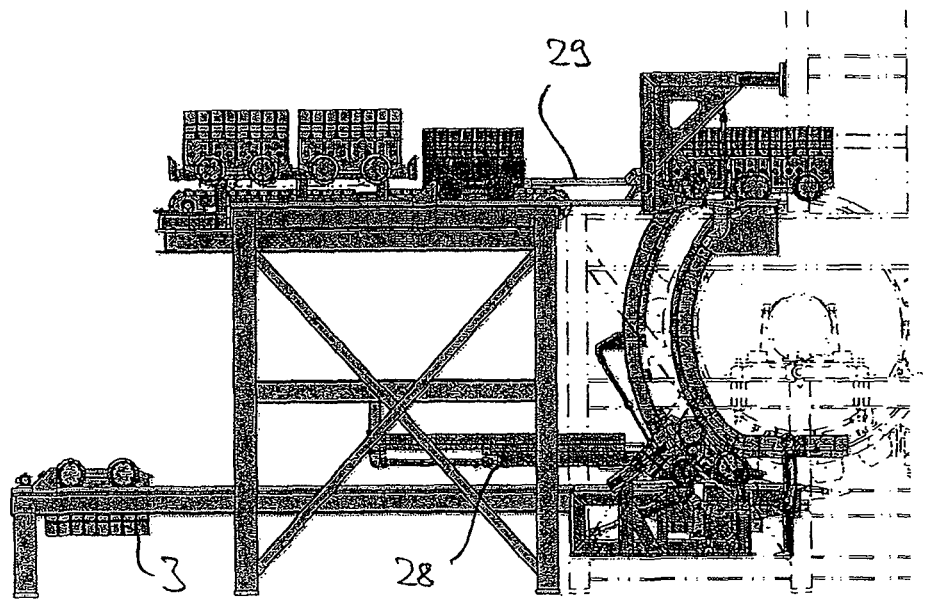

FIG. 7 schematically shows a pallet car changing device including supply and removal arrangement, with FIG. 7A showing a front view of the device and FIG. 7B showing a side view of the device.

FIG. 7B shows a pulling means 28 for pulling out the pallet cars 3 from the traveling grate 4. For inserting new pallet cars in the top strand of the lifting wheel 10, however, a pushing device 29 is provided, by means of which the pallet cars 3 can be pushed into the traveling grate 4.

Next, the construction of the removal switch 30, which is arranged on a frame 36, will be explained in detail with reference to FIG. 8.

Figure 8:
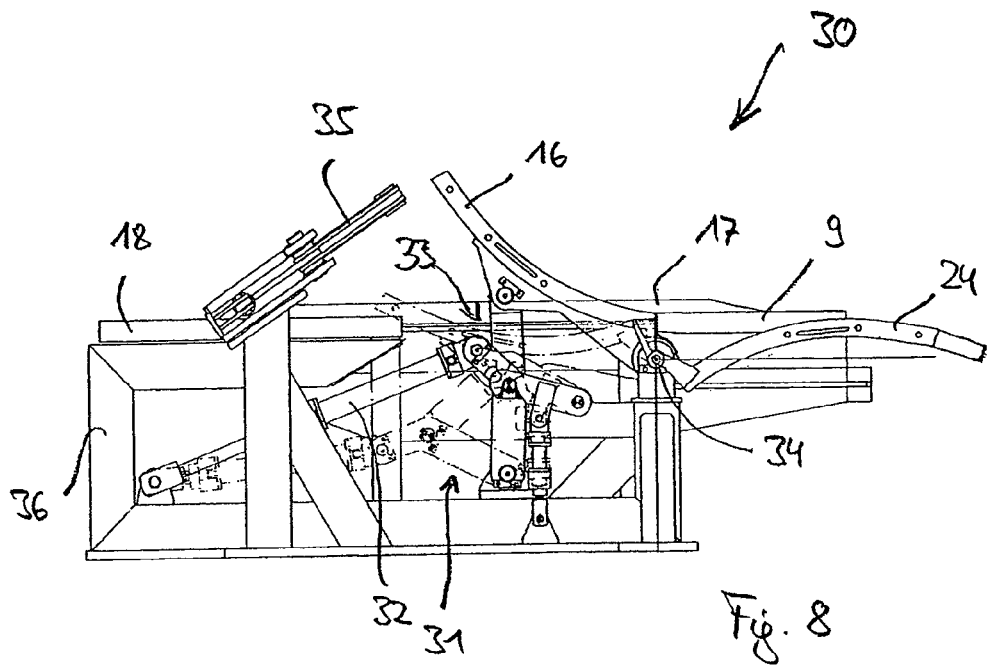

As can be taken from FIG. 8, the pivotable outer curve link 16 is provided subsequent to the outer rail guide 9, which is actuatable via an actuator transmission 31 consisting of a positioning cylinder 32 and a four-joint arrangement 33. In horizontal extension of the outer curve link 9 the guide rail 18 is provided, on which the track rollers 7 of the pallet car 3 can roll, when the same is pulled out from the traveling grate 4. In the drawing, the fixed switch 17 is arranged behind the rail elements 9, 16 and 18, which switch is slightly higher than the rail elements 9 and 18 and hence approximately lies at the level of the pressure roller 12 of the pallet car 3, as it is shown in FIG. 6.

Parallel to the outer curve link 16, the pivotable extended curve arc 24 is provided for the manual exchange. The extended curve arc 24 is pivotable about a joint 34 from the illustrated waiting position 24' into a position 24 directly beside the outer curve link 16, in which it can be used for the manual change. If no manual change is required, the extended curve arc 24 can be swiveled away or be utilized as reinforcement of the curve rail.

Reference numeral 35 designates a closing mechanism for locking the additional arc 25.

Figure 9:
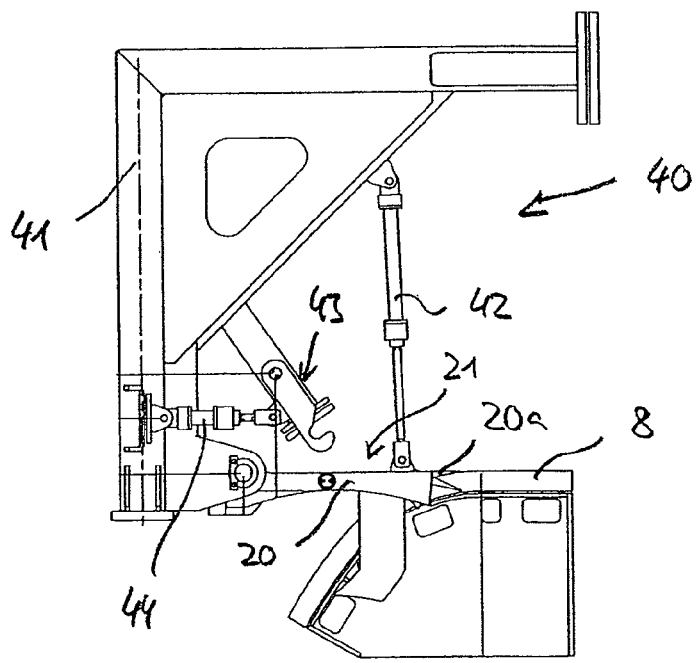

FIG. 9 shows the lifting device 40 for actuating the supply switch 21 in the top strand of the lifting wheel 10. On a frame 41, a coupler mechanism with hydraulic positioning cylinder 42 is provided, which engages the curve link 20. On its lower (inner) side, the curve link 20 has a contour which corresponds to the inner geometry of the outer rail guide 9. FIG. 9 shows the condition in which the curve link 20 is swiveled downwards for positioning the switch 21, so that the curve link 20 forms a path for bringing the new pallet car 3 onto the inner curve guide 8 of the continuous conveyor 6. Via a closing mechanism 43 in the form of a coupler mechanism with hydraulic positioning cylinder 44, the lifting device 42 can be locked after the changing operation. This ensures a stable guidance by the outer rail guide 9. To achieve a more uniform transition to the inner rail guide 8 of the continuous conveyor 6, a transition element 20a can be provided on the curve link 20.

With the invention, a continuous change of pallet cars of a traveling grate can be achieved in a simple way, without expensive lifting means being required for lifting out the pallet cars. Due to the switch solution according to the invention, in which the pallet cars are moved out from the traveling grate on their track and pressure rollers, a simpler, faster and safer change of the pallet cars can be realized. If a pallet car is damaged such that it cannot be removed from the traveling grate via its pressure rollers, a device for a manual change is provided in addition, which is however only used in exceptional cases.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 pelletizing machine
2 hood
3 pallet car
4 traveling grate, pallet car chain
5 top strand
6 continuous conveyor
7 track roller of the pallet car
8 inner rail guide
9 outer rail guide
10 lifting or drive wheel
11 tooth gap
12 pressure roller of the pallet car
13 lowering or driven wheel
14 tooth gap
15 bottom strand
16 outer curve link 17 fixed switch
18 guide rail
20 pivotable curve link
21 supply switch
22 supply rail
24 extended curve arc
25 second arc
26 grate
27 side wall
28 pulling device
29 pushing device
30 removal switch
31 lifting device
32 positioning cylinder
33 closing mechanism
34 joint
35 closing mechanism
36 frame
40 lifting device
41 frame
42 positioning cylinder
43 closing mechanism
44 positioning cylinder

The invention claimed is:

1. A device for changing a pallet car in a plant for the treatment of bulk materials, the plant having pallet cars that are continuously conveyed by using a lifting wheel and a lowering wheel on an outer rail and an inner rail in an endless chain, wherein, in a region of a bottom strand of the lifting wheel, a first outer curve link of the outer rail is openable such that the pallet car is removable from the chain, and wherein, in a region of a top strand of the lifting wheel, a second outer curve link of the outer rail is openable such that the pallet car is insertable into the chain, the device comprising a removal switch disposed in the region of the bottom strand of the lifting wheel, via which the pallet car is movable out from the chain, and a supply switch disposed in the region of the top strand of the lifting wheel, via which the pallet car is insertable into the chain, wherein the removal switch includes a fixed switch configured to engage pressure rollers of the pallet car.

2. The device according to claim 1, wherein the first outer curve link is pivotable, the removal switch including the first outer curve link.

3. The device according to claim 1, further comprising a pulling device for pulling out the pallet car which is associated to the removal switch.

4. The device according to claim 1, wherein the second outer curve link is pivotable, the supply switch including the second outer curve link.

5. The device according to claim 1, further comprising a common actuator transmission configured to position the supply switch and open the second outer curve link at the top strand of the lifting wheel.

6. The device according to claim 5, wherein the actuator transmission is arranged above the second outer curve link.

7. The device according to claim 4, wherein the second outer curve link forms both an outer curve guide and a rail for inserting the pallet car.

8. The device according to claim 1, further comprising a pushing device for inserting the pallet car which is associated to the supply switch.

9. A device for changing a pallet car in a plant for the treatment of hulk materials, the plant having pallet cars that are continuously conveyed by using a lifting wheel and a lowering wheel on an outer rail and an inner rail in an endless chain, wherein, in a region of a bottom strand of the lifting wheel, a first outer curve link of the outer rail is openable such that the pallet car is removable from the chain, and wherein, in a region of a to strand of the lifting wheel, a second outer curve link of the outer rail is openable such that the pallet car is insertable into the chain, the device comprising a removal switch dispose in the region of the bottom strand of the lifting wheel, via which the pallet car is movable out from the chain, and a supply switch disposed in the region of the top strand of the lifting wheel, via which the pallet car is insertable into the chain, the device further comprising a second, parallel and movable curve arc disposed on the removal switch.

10. The device according to claim 9, wherein the second curve arc has a greater length than the first outer curve link.

11. The device according to claim 9, wherein the outer rail includes a second pivotable arc disposed adjacent to the first outer curve link.

12. A method for changing a pallet car in a plant for the treatment of bulk materials, the plant having pallet cars that are continuously conveyed on an outer rail and an inner rail in an endless chain via a lifting wheel and a lowering wheel, the method comprising:
   opening a first outer curve link of the outer rail in a region of a bottom strand of the lifting wheel and moving the pallet car out from the chain via a removal switch, the removal switch including a fixed switch,
   engaging, by the fixed switch of the removal switch, pressure rollers of the pallet car,
   swiveling the first outer curve link back again so as to close the outer rail,
   swiveling a second outer curve link of the outer rail in a region of a top strand of the lifting wheel so as to open a supply switch and moving another pallet ear into the chain via the supply switch, and
   swiveling the second outer curve link back again so as to close the outer rail.

* * * * *